United States Patent [19]
Nishimura

[11] 3,955,185
[45] May 4, 1976

[54] POWER SUPPLY FOR CALCULATORS

[75] Inventor: Kousuke Nishimura, Nara, Japan

[73] Assignee: Sharp Kabushiki Kaisha, Osaka, Japan

[22] Filed: Nov. 29, 1973

[21] Appl. No.: 420,062

[30] Foreign Application Priority Data
Nov. 29, 1972  Japan.............................. 47-119705

[52] U.S. Cl............................ 340/324 R; 235/156; 340/309.1; 340/332; 340/377
[51] Int. Cl.²........................................... G08B 5/36
[58] Field of Search............. 340/324 R, 336, 309.1, 340/326, 332, 377, 333, 172.5; 235/156

[56] References Cited
UNITED STATES PATENTS

| | | | |
|---|---|---|---|
| 2,769,970 | 11/1956 | Kratville | 340/332 X |
| 3,714,867 | 2/1973 | Dargent | 340/309.1 X |
| 3,755,806 | 8/1973 | Bunting | 340/324 R |

Primary Examiner—David L. Trafton
Attorney, Agent, or Firm—Stewart and Kolasch, Ltd.

[57] ABSTRACT

To avoid useless power consumption in electronic apparatus equipped with display units, for example, such as electronic desk-top calculators with light-emitting diodes, a pair of timer arrangements are provided between the display units and power source thereof. The first timer arrangement serves to turn the display units from the first display condition to the second display condition or more particularly reduce brightness of the display units. After operating the first timer arrangment, power supply is inhibited to at least the display units by means of the second timer arrangment.

7 Claims, 9 Drawing Figures

POWER SUPPLY FOR CALCULATORS

BACKGROUND OF THE INVENTION

This invention relates to an electronic apparatus equipped with display units and more particularly to a power supply system utilizing a timer arrangement for avoiding useless power consumption.

Sometimes, a power switch of an electronic apparatus is left ON for a long period of time. This results in power consumption and in some instances failure in the apparatus. In receent years, considerable effort has been directed toward the development of a battery-powered calculator which enables a considerable reduction in power consumption.

The object of this invention is to provide an electronic apparatus which can avoid useless power consumption as discussed above.

SUMMARY OF THE INVENTION

In an electronic apparatus with a display panel embodying this invention, the display state of the display panel is modified and then de-energized when a given period of time passes after operation of the apparatus, together with the case when a power switch is left ON for a long period of time. To this end, a pair of mechanical or electrical timer arrangements are applied to achieve the modification in the display state and inhibition of power supply thereto.

DETAILED DESCRIPTION

For the purpose of simplicity and clarity, the teachings of the invention will be set forth in terms of an electronic calculator. It will be understood, however, that the teachings of the invention are applicable as well to other apparatus equipped with a display panel.

Figure 1:
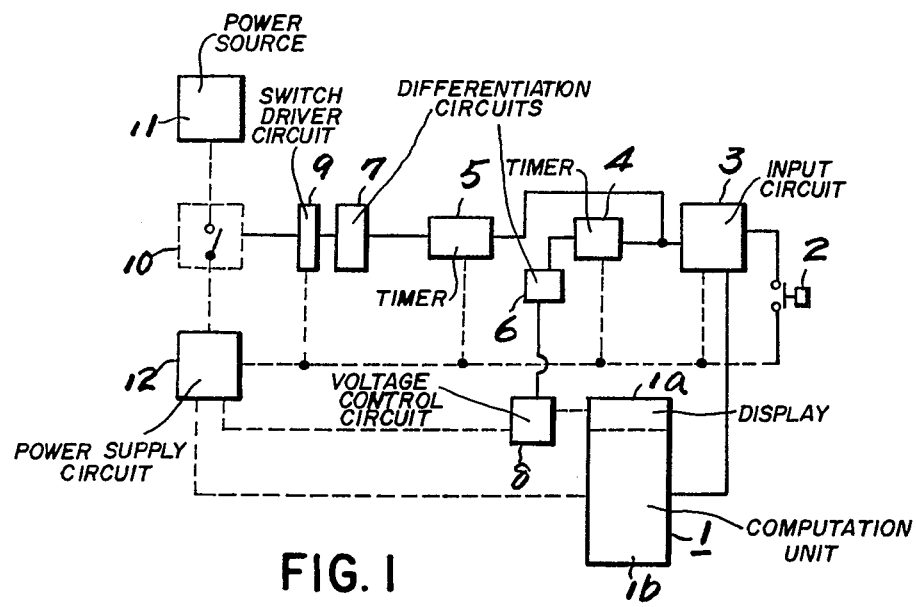
FIG. 1 is a schematic block diagram showing one embodiment of this invention.
Figure 2:
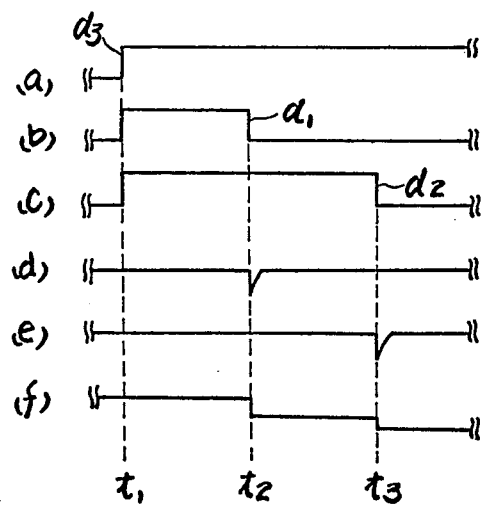
FIG. 2 is a time chart showing the relation of various pulses which occur in the system illustrated in FIG. 1.

Referring now to FIGS. 1 and 2, there is illustrated an electronic calculator 1 embodying this invention which mainly comprises a display panel 1a for displaying intelligence signals and a computation unit 1b for accepting signals associated with depression of a specified key 2 through an input circuit 3. The latter delivers to a pair of timers 4,5 the signals shown by FIG. 2(a) and associated with the depression of the key 2. The timers 4,5 provide respectively voltage pulses of different pulse durations in response to the voltage pulses from the input circuit 3 as shown by FIG. 2(a). The trailing edges $d_1$, $d_2$ of output voltage pulses from the timers 4,5 trigger a pair of differentiation circuits 6,7, the outputs of which arrive at a voltage control circuit 8 associated with the display device 1a and at a switch driver circuit 9 to control ON and OFF operations of a switch 10. The voltage to these circuit units is supplied by a power source 11 such as a battery and a power supply circuit 12.

Out of lines coupling the individual circuit units as shown in FIG. 1, the solid lines shown input and output lines and dotted lines show power supply lines feeding voltage from the power source 11 or power supply circuit 12 to the units 1-9.

The following is a description of the operation of the electronic apparatus of the above mentioned structure embodying this invention.

When the operator manually operates a specified key 2, the signal associated with such depression of the key 2 develops, as shown by FIG. 2(a), from the input circuit 3 at the time $t_I$.

Then, the timers, 4,5 start operating in synchronization with the leading edge $d_3$ of the output signal from the input circuit 3 and provide voltage pulses of different pulse durations as the outputs thereof. The differentiation circuit 6 responds to the trailing edge $d_1$ of the voltage pulse of shorter duration as shown by FIG. 2(b) and delivers the differentiated output at the time $t_2$, as shown in FIG. 2(d). The voltage control circuit 8 accepts the differentiated output so that the voltage level applied to the display unit 1a is changed to the lower level for the period from $t_2$ to $t_3$, as shown by FIG. 2(f). The change in the voltage level will result in modification in tint or brightness of the display device, for example, such as liquid crystal display panel, fluorescent display tube and so on. A decrease in the voltage applied thereto can provide a considerable redution in power consumption.

Afterward, when the output of the other timer 5 drrops at the time $t_3$, the differentiation circuit 7 produces the differentiation output as shown by FIG. 2(e) at the time $t_3$ upon the trailing edge $d_2$ of the occurrence timer 5 output. In response to the differentiation output from circuit 7, the switch driver circuit 9 has the function of opening the switch 10 with the result in breaking a path between the power source 11 and power circuit 12. Due to such breaking no voltage is fed to the individual units 1,3,4,5 - - - which are tied to the power supply circuit 12 by the dotted lines. Hence, the apparatus does not consume power after the time $t_3$.

Figures 3A, 3B:
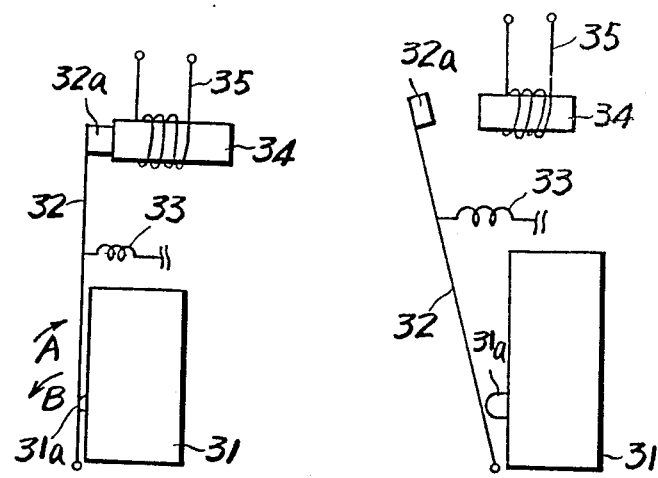
FIGS. 3(a) and 3(b) illustrate a switch arrangement used in the embodiment illustrated in FIG. 1.

Problems have been encountered if the above described switch 10 is implemented with the arrangement of FIG. 3(a) and 3(b).

In these drawings 31 represents a normal open switch of micro-switch type which connects the power source 11 and power supply circuit 12 together when the knob 31a therof is depressed as shown in FIG. 3(a) and alternatively breaks the path therebetween when the same is not depressed as shown in FIG. 3(b). As is well known, the switch 31 includes an actuator 32 which rotates about the one end thereof and has a permanent magnet 32a. A spring 33 is secured to the central portion of the actuator 32 to offer a repulsive force to the actuator 32. The actuator 32 is electromagnetically driven by a combination of a core 34 and a coil 35.

In operation of the apparatus by means of power supply, the core 34 is not magnetized so that due to an attraction force of the magnet 32a, the actuator 32 moves in the direction indicated by the arrow A against the repulsive force of the spring. At this time the switch knob 31a is depressed and accordingly the path between the power source 11 and power circuit 12 becomes conductive upon the closure of the switch 31. When the output of the switch driver circuit 9 appears across the coil 35, the core 34 is magnetized in the direction expelling the permanent magnet 32a and the actuator 32 moves in the direction indicated by the arrow B in accordance with sum of such expelling force and the repulsing force of the spring 33. The result is displacement of the actuator 32 to the position as shown in FIG. 3(b). At this time the knob 31a is allowed to protrude in such a direction to break the connection between the power source and power supply circuit 12.

Nevertheless, when the actuator 32 is spaced away from the core 34 by a small distance, the knob 31a breaks the circuit therebetween and accordingly the voltage applied across the coil 35 approximates the zero voltage. As a consequence, the magnetism occurring on the core 34 in the direction expelling the permanent magnet 32a will disappear and the non-magnetized core 34 will attract the magnet 32a. The switch 31 returns back to the condition as shown in FIG. 3(a) at once. In other words, the application of the breaking signals fails to turn the power supply path OFF.

It is desirable for the reason discussed above that the voltage to the coil 35 is of such an amplitude to move the actuator 32 to a sufficient distance where the repulsing force of the spring 33 is stronger than the attracting force between the core 34 and permanent magnet 32a or, hence the attracting force does not extend to the core 34.

Figure 4:
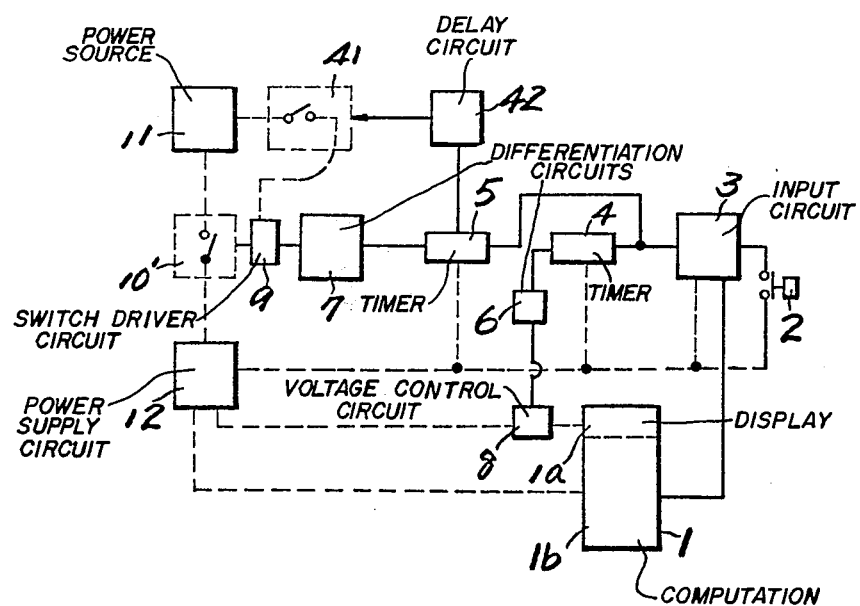
FIG. 4 is a schematic block diagram showing another embodiment of this invention.
Figure 5:
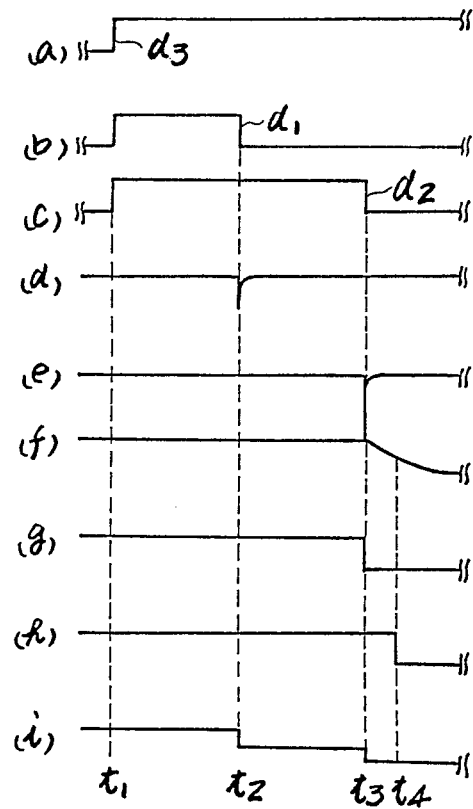
FIG. 5 is a time chart showing the relation of various pulses occurring in the modification of FIG. 4.

The arrangment of a system illustrated with reference to FIGS. 4 and 5 shows one approach to avoiding the above described disadvantage. This structure is the same as that of FIGS. 1 and 2 with the exception that ON and OFF states of a switch 41 for controlling voltage supply of the power source 11 to the switch driver arrangment 9 are accomplished by a delay circuit 42. 10' is the switch as illustrated in FIG. 3.

The outputs (FIG. 5(c), at the time $t_3$ from the timer 5 are introduced into the delay circuit 42 and the differentiation circuit 7. The delay circuit 42 serves to decrease the voltage level by degrees after the time $t_3$, as shown by FIG. 5(f), in responce to the outputs of the timer 5.

When a predetermined voltage level is reached at the time $t_4$, the switch 41 is open to inhibit the power voltage supply to the switch driver 9.

Accordingly, the switch 10' is OFF by operations of the switch driver 9 at the time $t_3$. During the period from the time $t_3$ to the time $t_4$, the switch driver 9 provides voltage between the both terminals of the coil 35 so that the actuator moves in the B direction to a position where the attracting force between magnet 32a and core 34 is negligible. The actuator 32, therefore, will not rotate again in the A direction even if the magnetism on the core 34 disappears until the opening of the switch 41 at the time $t_4$.

Figure 6:
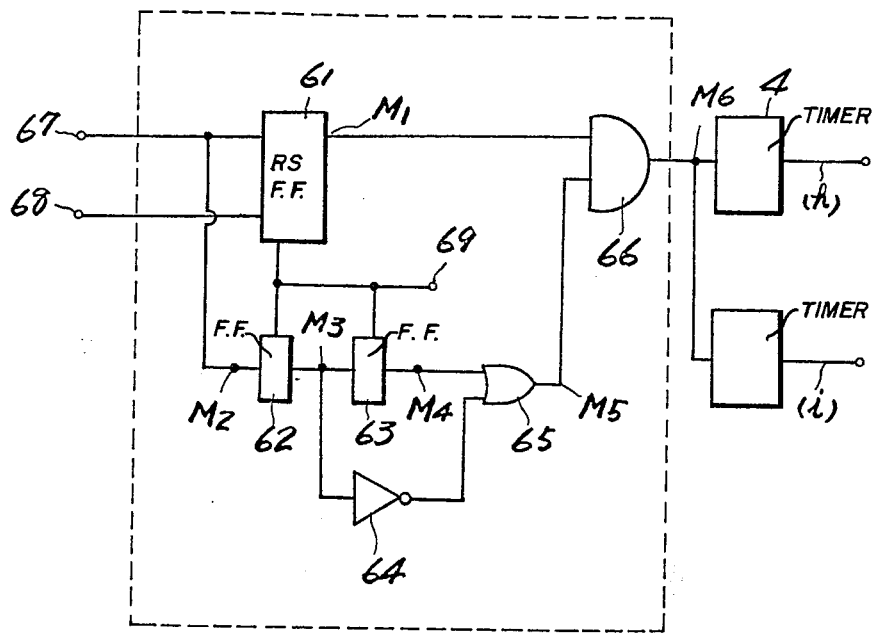
FIG. 6 is a logic diagram of a trigger and reset circuit for the timer arrangements used in this invention.
Figure 7:
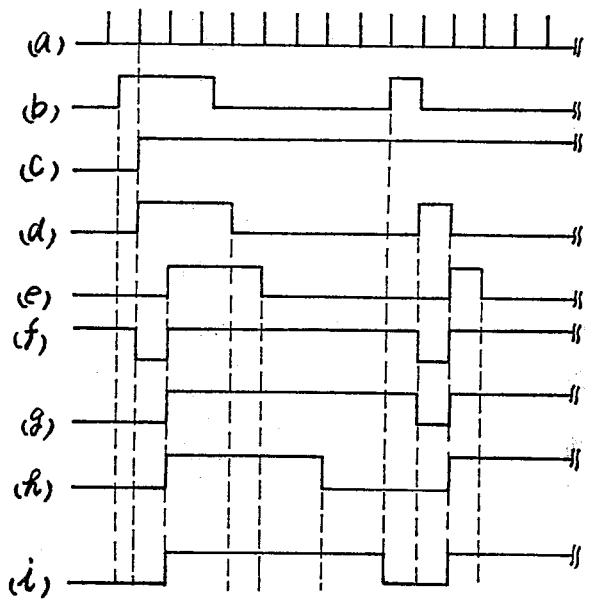
FIG. 7 is a time chart illustrating pulses occurring in the FIG. 6 circuit.

One way of triggering the pair of timers 4,5 in response to the signals associated with the key depression will be seen from FIGS. 6 and 7.

In FIG. 6 the triggering and clearing circuit arrangement is comprised of a RS type flip-flop 61, D type flip-flops 62, 63, an inverter 64, an OR circuit 65, and an AND circuit 66. Moreover, such a circuit arrangement has a terminal 67 accepting the signals associated with the key depression, a terminal 68 accepting reset signals for the RS type flip-flop 61 for a certain duration of time after a power throw, and a terminal 69 accepting signals of a fixed repetition frequency occurring within the apparatus.

First, the signals as shown by FIG. 7(b) arrive at the terminal 67. Since the flip-flop 61 is in the reset condition prior to such reception, the voltage pulse shown by FIG. 7(c) develops at the output M1 of the flip-flop 61 in synchronization with the signals of FIG. 7(a) thus accepted by the terminal 69. The signals at the the terminal 67 are applied to the input side M2 of the D type flip-flop 62 in addition to the flip-flop 61. At this time the flip-flops 62, 63 derive from the outputs M3, M4 thereof the time-delayed voltage pulses as shown by FIGS. 7(d) and 7 (e). When the OR circuit 65 recieves the outputs from the inverter 64 and the voltage pulse shown by FIG. 7(e), the OR circuit 65 produces at the output site M5 the voltage pulse of FIG. 7(f).

Thereafter, when the AND circuit 66 receives the outputs of the flip-flop 61 and the outputs of the OR circuit 65, the outputs having the waveform shown by FIG. 7(g) appear at the output site M6 of the AND gate 66. Upon receipt of the outputs of FIG. 7(g) from the AND circuit 66, the individual timers 4,5 provide the voltage pulses of FIGS. 7(h) and 7(i) having different pulse durations, respectively.

Figure 8:
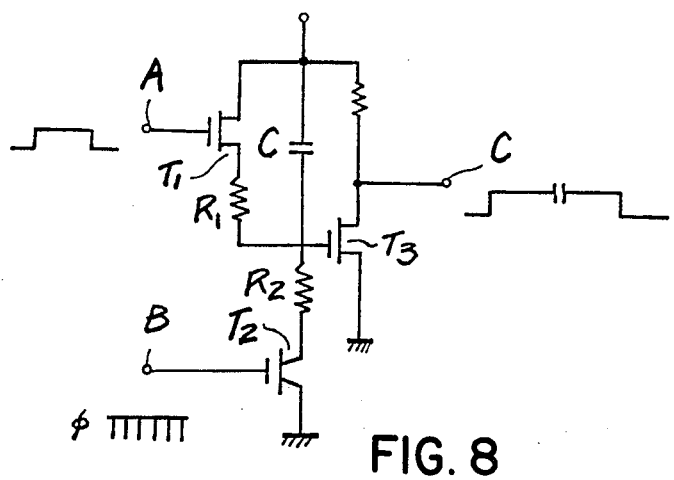
FIG. 8 is a detailed wiring diagram showing one example of the timer arrangment.

An example of electrical construction of the timers 4,5 is illustrated in FIG. 8, which comprises three gate-insulated transistors T1–T3, three resistors $R_1$–$R_3$, a capacitor C, a terminal A accepting signals for discharging charge stored on the capacitor C and resetting the timer, a terminal B accepting signals for controlling a charging rate and determining the time period set by timer arrangement, and a terminal C delivering the outputs of the timer arrangment. Needless to say, the timer arrangment may be of mechanical type.

I claim:

1. An electronic apparatus including a computation circuit and display means therefor comprising:
   a power source for activating the electrical components of said computation circuit and said display means;
   first timer means for decreasing the amount of power supplied to said display means by a predetermined amount after the lapse of a first predetirmined time period; and
   second timer means for precluding the application of power from said power supply to both said electrical components and said display means after the lapse of a second predetermined time period.

2. The electronic apparatus as defined in claim 1, wherein means are provided for initiating said first and second time periods simultaneously in response to an output signal from said computation circuit and said second time period is of longer duration than said first time period.

3. The electronic apparatus of claim 1 wherein the electronic apparatus is an electronic calculator.

4. An electronic calculator and a display means therefor comprising:
   key input circuit means for introducing inputs to said calculator in response to actuation of selected keys of a keyboard means;
   first timer means for generating an output after the lapse of a first predetermined period of time in response to outputs from said key input circuit means;
   voltage control means for reducing the voltage applied to said display means to a predetermined value, said voltage control means being actuated by outputs from said first timer means;

second timer means for generating an output after the lapse of a second predetermined period of time in response to outputs from said key input circuit means;

a power source;

a power supply circuit for said power source for feeding power to the electrical components of the electronic calculator; and switch means in said power supply circuit for disconnecting said power source from said electrical components in response to outputs from said second timer means.

5. The electronic calculator as defined in claim 4 comprising a first differentiation circuit disposed between said first timer means and said voltage control means and a second differentiation circuit disposed between said second timer means and said switch means.

6. The electronic calculator as defined in claim 4, wherein each of said timer means comprises an RC timing network.

7. An electronic calculator and display means therefor comprising:

key input circuit means for introducing input signals to said calculator in response to actuation of selected keys on a keyboard;

timer means for generating an output signal a predetermined period of time after the occurrence of input signals from said key input circuit means;

a power supply for energizing the electrical components of said calculator and said display means;

electromagnetic switch means in circuit between said power supply and both said electrical components and said display means, said switch means including an actuator arm and an electromagnetic armature for displacing said arm, said switch means disconnecting the power supply from said electrical components and display means in response to displacement of said actuator arm;

voltage supply means for energizing said electromagnetic armature with a voltage of a predetermined value to displace said actuator arm in response to an output pulse from said timer means; and time delay means for gradually decreasing said voltage supplied to said armature from said predetermined value to substantially zero;

whereby said actuator arm is displaced a sufficient distance to preclude the accidental reconnection of said power supply to said electrical components and said display means.

* * * * *